US007317857B2

(12) United States Patent
Manyam et al.

(10) Patent No.: US 7,317,857 B2
(45) Date of Patent: Jan. 8, 2008

(54) OPTICAL FIBER FOR DELIVERING OPTICAL ENERGY TO OR FROM A WORK OBJECT

(75) Inventors: Upendra H. Manyam, Weatogue, CT (US); Martin Seifert, West Simsbury, CT (US); Kanishka Tankala, South Windsor, CT (US)

(73) Assignee: Nufem, East Granby, CT (US)

( * ) Notice: Subject to any disclaimer, the term of this patent is extended or adjusted under 35 U.S.C. 154(b) by 194 days.

(21) Appl. No.: 11/120,358

(22) Filed: May 2, 2005

(65) Prior Publication Data

US 2005/0265678 A1     Dec. 1, 2005

Related U.S. Application Data

(60) Provisional application No. 60/567,533, filed on May 3, 2004.

(51) Int. Cl.
*G02B 6/02* (2006.01)

(52) U.S. Cl. .................................... 385/127; 385/126

(58) Field of Classification Search .................... None
See application file for complete search history.

(56) References Cited

U.S. PATENT DOCUMENTS

| | | | |
|---|---|---|---|
| 4,473,273 | A | 9/1984 | Hodge |
| 4,815,079 | A | 3/1989 | Snitzer |
| 5,298,047 | A | 3/1994 | Hart, Jr. |
| 5,418,881 | A | 5/1995 | Hart, Jr. |
| 5,533,163 | A | 7/1996 | Muendel |
| 5,644,670 | A * | 7/1997 | Fukuda et al. ............... 385/124 |

(Continued)

FOREIGN PATENT DOCUMENTS

WO     WO 99/30391     6/1999

OTHER PUBLICATIONS

Skutnik, "Hard Plastic Claddings: Nearing Two Decades of Performance", Chapter 9, American Chemical Society Symposium Series 795, edited by Julie P. Harmon and Gerry K. Noren, 2001.
3m Power Core Fiber Products Catalog, dated 1995, No. 78-6900-3459-6, Revision A.
Specialty Fiber Technologies Catalog from Lucent Technologies, 2001.
Sumitomo website pages, printed Apr. 2, 2003.
Hunter et al.; "Designing a fiber-optic beam delivery system"; Source Unknown; 1997.

(Continued)

*Primary Examiner*—Tina M. Wong
(74) *Attorney, Agent, or Firm*—Peter J. Rainville

(57) ABSTRACT

An optical fiber can include a glass core that is multimode at a selected wavelength and that comprises an index of refraction and a diameter $D_{core}$, a glass cladding disposed about said glass core, said glass cladding comprising an outer diameter $D_{cladding}$ and a first index of refraction that is less than said index of refraction of said core, and a second cladding disposed about said glass cladding, said second cladding comprising an optically cured polymer, said polymer comprising an index of refraction that is less than said first index of refraction. In certain embodiments, the fiber can include various other features. For example, $[D_{cladding}/D_{core}]^2$ can be no greater than 1.5; the polymer can have a modulus of no greater than 100 MPa; the core can include means for affecting the power distribution amongst modes propagated by the core, such as by having a non circular outer perimeter; the core can support at least 100 modes at the selected wavelength; $D_{core}$ can be at least 250 microns; the fiber can include a region disposed about the second cladding, and the region can comprise a polymer comprising an index of refraction that is greater than the index of refraction of said core. The fiber can be used, for example, for delivering light having the selected wavelength to or from a work object.

36 Claims, 8 Drawing Sheets

U.S. PATENT DOCUMENTS

| | | | |
|---|---|---|---|
| 5,864,645 | A | 1/1999 | Zellmer |
| 5,873,923 | A | 2/1999 | DiGiovanni |
| 5,949,941 | A | 9/1999 | DiGiovanni |
| 5,966,491 | A | 10/1999 | DiGiovanni |
| 6,018,533 | A | 1/2000 | Krivoshlykov |
| 6,115,526 | A | 9/2000 | Morse |
| 6,118,575 | A * | 9/2000 | Grubb et al. ............... 359/337 |
| 6,157,763 | A | 12/2000 | Grubb |
| 6,477,307 | B1 | 11/2002 | Tankala |
| 6,483,973 | B1 | 11/2002 | Mazzarese |
| 6,606,441 | B2 * | 8/2003 | Irie et al. .................... 385/127 |
| 6,687,046 | B2 * | 2/2004 | Leplingard et al. ...... 359/337.4 |
| 6,950,586 | B2 | 9/2005 | Po |
| 6,954,575 | B2 * | 10/2005 | Fermann et al. ............ 385/128 |
| 6,969,022 | B2 * | 11/2005 | Bell et al. ................ 242/379.1 |
| 7,215,858 | B2 | 5/2007 | Po |
| 2005/0159671 | A1 | 7/2005 | Sneddon |
| 2005/0271347 | A1 * | 12/2005 | Kimball et al. ............. 385/142 |

OTHER PUBLICATIONS

Hunter et al.; "Selecting a High-Power Fiber-Optic Laser Beam Delivery System"; Laser Institute of America, Proceedings ICALEO 81E, pp. 173-182, 1996.

Dawson et al.; "Large flattened mode optical fiber for high output energy pulsed fiber lasers"; CLEO 2003, Jun. 3, 3.30-3.45, CWD5.

Proposal to (redacted) Corporation, "Delivery Fiber...", prepared by Nufem, Feb., 2003.

Ghatak et al.; "Design of Waveguide Refractive Index Profile to Obtain Flat Model Field", SPIE vol. 3666, pp. 40-44 (1998).

DSM Desotech, Product Data Sheet, DeSolite 3471-1-152A.

* cited by examiner

OPTICAL FIBER FOR DELIVERING OPTICAL ENERGY TO OR FROM A WORK OBJECT

CROSS-REFERENCE TO RELATED APPLICATION

This application claims priority to provisional patent application 60/567,533, filed May 3, 2004 and entitled, when filed, "Improved Optical Fiber for Delivering Optical Energy to or from a Work Object", and which is herein incorporated by reference.

FIELD OF THE INVENTION

The present invention relates to optical waveguides, and more particularly, to optical fibers, methods of making optical fibers, and to apparatus and systems using optical fibers.

BACKGROUND OF THE INVENTION

Optical fibers are often used to deliver optical energy from an energy source to a work object or from a work object to a receiving apparatus. The optical energy can be used, for example, for imaging, illuminating, measuring or modifying the work object. In many applications the energy source is a laser and the optical fiber delivers laser light to the work object. For example, in an industrial setting a high power laser, such as a Nd YAG laser, can be used for cutting and/or welding, and an optical fiber can deliver the light from the Nd YAG laser to, for example, an automotive body for welding a seam on the body. Typically, a robotic arm moves one end of the optical fiber about for welding along the seam. As another example, in a medical setting an alexandrite laser can be used to remove unwanted hair from the body of a patient. Again an optical fiber delivers the light from the alexandrite laser to the patient. A physician can grasp one end of the fiber and direct light to a particular region of the patient's body. In yet a further example, an optical fiber can deliver light to a gaseous work object for performing, for example, Raman spectroscopy on the object. In this instance a detector and a receiver are used for analyzing light reflected from or transmitted through the work object, and an optical fiber can also deliver the reflected or transmitted light to the detector and/or receiver. The foregoing are merely three examples; many others exist.

Unfortunately, although many fibers are available in the art, it is not unknown for a fiber to fall short of meeting one or more of the performance criteria that can be relevant in a particular application. In many instances, a compromise is made in the design of a fiber wherein one performance characteristic is reduced to ensure higher performance according to another characteristic.

Accordingly it is an object of the present invention to provide an improved optical fiber that addresses one or more of the deficiencies or drawbacks of the prior art.

SUMMARY OF THE INVENTION

In one aspect the invention provides an optical fiber, and methods for providing and/or using such a fiber, that comprises a glass core comprising a diameter, a cladding, which can comprise a glass, disposed about the core and comprising an index of refraction and a diameter, and a second cladding disposed about the cladding. The second cladding can comprise an optically cured polymer, where the optically cured polymer comprises an index of refraction that is less than the index of refraction comprised by the cladding and has a modulus of no greater than 100 MPa. In one practice, the ratio of the squares of the diameter comprised by the cladding to the diameter comprised by the core can be no greater than 1.5.

It can be desirable in some instances that a fiber deliver a certain beam profile, such as for, example, to selectively image, illuminate, measure, or modify a work object. The beam profile is determined at least in part by the distribution of power amongst the various modes that can be propagated by the fiber. In another aspect, the Applicants' invention provides an optical fiber, and methods for providing and/or using such a fiber, that comprises provision for affecting the distribution of power amongst the modes of a multimode core to provide a selected beam intensity profile. Such provision can include the core having a non-circular outer perimeter. For example, the outer perimeter of the core can include inwardly oriented sections.

In another aspect, the Applicants' invention provides an improved optical fiber comprising a multimode core, where the core comprises an inner region comprising a first index of refraction and a second region disposed about the inner region, where the second region has a second index of refraction that is greater than the index of refraction of the inner region by a selected amount. The fiber further comprises a cladding comprising an index of refraction that is less than the indices of refraction of the first and second regions.

A fiber according to the invention can operate a selected operating wavelength, which can be selected to be in the range from about 200 nm to about 2 microns. In one practice, the operating wavelength is no less than 180 nm; in another practice, the operating wavelength is no greater than 2 microns. The operating wavelength can be greater than 2 microns, (e.g., the operating wavelength can be no less than 20 or no less than 30 microns, such as, for example, when a fiber according to the invention is based on a chalcogenide glass). A core of a fiber according to the invention can be multimode at a selected wavelength. For example, by way of presenting examples and not of limitation, a core of a fiber according to the invention can be multimode so as to support at least 50 modes; at least 100 modes; at least 500 modes; at least 1000 modes; or at least 5000 modes at a wavelength of operation. In certain practices of the invention, the core of the fiber can have a numerical aperture than can be from 0.1 to about 0.6. For example, the numerical aperture of the core can be no less than about 0.12.

Typically a fiber according to the invention includes a core that is substantially free of any rare earths, where the rare earths are those elements having atomic numbers from 57 to 71.

The invention comprises many aspects, some of which are presented in the above discussion, which is exemplary and not limiting.

Not every component is labeled in every one of the foregoing FIGURES, nor is every component of each embodiment of the invention shown where illustration is not considered necessary to allow those of ordinary skill in the art to understand the invention. The FIGURES are schematic and not necessarily to scale.

When considered in conjunction with the foregoing FIGURES, further features of the invention will become apparent from the following detailed description of non-limiting embodiments of the invention.

DETAILED DESCRIPTION

Figure 1:
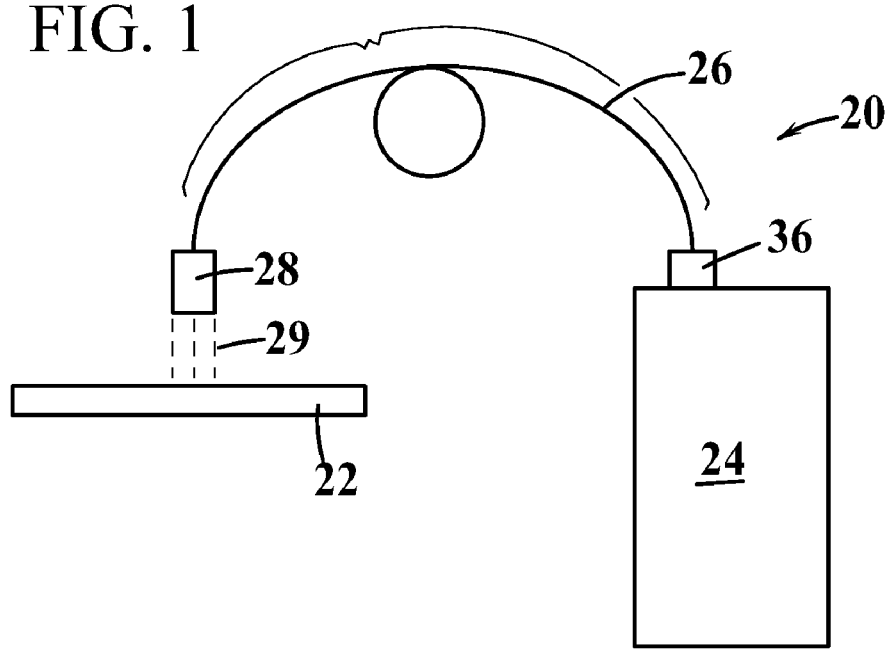
FIG. 1 illustrates an optical apparatus, including an optical delivery fiber, for delivering optical energy to or from a work object.

FIG. 1 illustrates an optical apparatus 20, which can be used, for example, for imaging, illuminating, modifying or measuring a work object 22. The apparatus 20 includes a light source 24, such as a laser, and an optical fiber 26 for delivering light from the light source 24 to the work object 22. An optical element 28, such as, for example, a collimator or an assembly of lenses, conditions the light guided by the optical fiber 26 so as to provide light beam 29 having selected characteristics (e.g., collimated to a certain beam diameter or focused to a particular spot size) to the work object 22. The length of the optical fiber 26 can range from tens or hundreds of meters, such as in an industrial setting, to a few meters, such as in a medical environment. In other applications even shorter lengths of the fiber 26 are appropriate. In an industrial environment the light source 24 can be a continuous wave (CW) Nd YAG laser having an output wavelength of about 1.064 nm and the work object 22 can be an automotive part that is being welded or cut by the light beam 29. In this instance a robotic arm typically moves the optical element 28 about a work area for welding or cutting work objects and various portions of work objects. In a medical environment the light source can be a pulsed alexandrite laser providing pulses having a fundamental wavelength of about 755 nm for removing unwanted hair from a patient. In this instance a physician grasps the optical element 28 and manually directs the light beam 29 to the proper work area. The fiber 26 can be repeatedly moved about and bent when in use. For example, a physician performing a hair removal procedure typically bends the fiber about his or her shoulder and downwardly directs the light beam 29 onto a prone patient.

The foregoing are merely two examples where an optical apparatus and/or optical fiber of the present invention can be useful. Many more exist. For example, optical apparatus such as that schematically illustrated in FIG. 1 can be used in the following applications: industrial materials processing applications in addition to cutting and welding (e.g., drilling, marking, and heat treating); medical applications in addition to hair removal, such as providing a laser scalpel, welding tissue, photo-dynamic therapy and drilling for dentistry; laser trimming of semiconductor component values; spectroscopic detection of trace gases, heavy metals, or biowarfare agents; screening explosives; detecting mines; soldering and brazing; high speed printing; large scale RGB projection systems; ultraviolet (UV) lithography; direct-writing of photoresist for the manufacture of printed circuit boards (PCB's); and drilling vias in PCB's. The foregoing list is merely exemplary, as other applications exist for the apparatus shown in FIG. 1. Source 24 and work object 22 can be a transmitter and receiver for communicating information therebetween.

Figure 2:
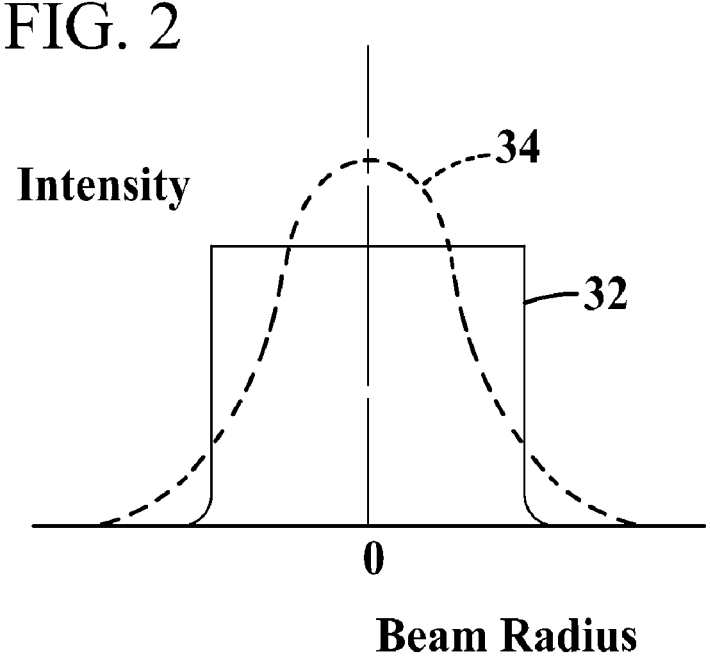
FIG. 2 schematically illustrates examples of two optical beam profiles that it can be desirable for the optical fiber of FIG. 1 to deliver.

FIG. 2 schematically illustrates a plot of the intensity of the optical beam 29 versus radial distance for one diameter across the optical beam 29. In many applications it is desirable to illuminate the work object 22 with a "top hat" intensity profile, as indicated by reference the numeral 32, rather than with the more Gaussian profile indicated by reference numeral 34. If the optical fiber 26 is a multimode fiber and is sufficiently long, the modes propagating along the optical fiber 26 can, in certain circumstances, naturally mix or scramble such that the optical fiber 26 propagates a top hat or more nearly top hat optical beam intensity profile. However, if the length of the optical fiber 26 is shorter, such natural mode mixing may not be adequate. One technique known in the art used to incorporate a stress element in the connector 36 that connects the optical fiber 26 to the light source 24. This stress element can be a cable that is wrapped around a selected length of the optical fiber 26 for imposing appropriate stress upon the optical fiber 26. In one aspect of the present invention, which is described in more detail below, the optical fiber 26 is adapted for affecting the power distribution amongst the modes for providing a selected beam intensity profile. Accordingly, the stress element, if used, need not provide as much stress (e.g., it can be smaller), or, in certain practices of the invention, the stress element can be eliminated completely.

Figure 3:
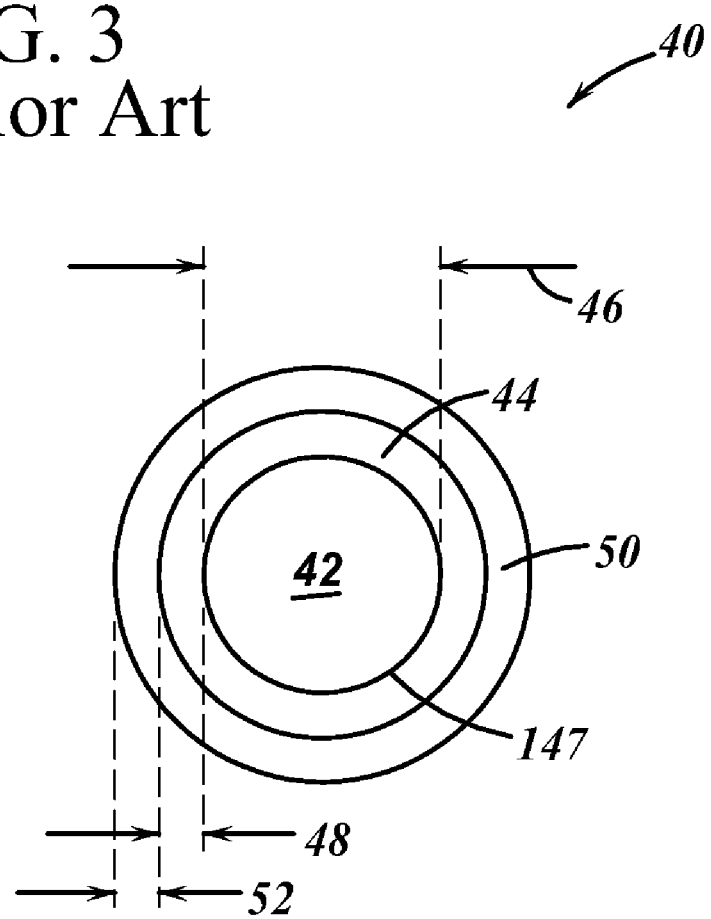
FIG. 3 schematically illustrates a cross section of an optical fiber known in the prior art and that can be representative of the cross section of a fiber used as the optical fiber of FIG. 1.

FIG. 3 schematically illustrates a cross section of an optical fiber known in the prior art and that is used as the optical fiber 26 in a prior art apparatus similar to the apparatus 20 shown in FIG. 1. The optical fiber 40 includes a core 42, which is typically silica, having a diameter, as indicated by reference numeral 46, of approximately 1500 microns. The cladding 44 surrounds the core 42 and comprises an index of refraction that is less than the index of refraction of the core 42. Typically, the cladding 44 comprises a hard polymer, which can have an index of refraction low enough to provide a numerical aperture (NA) of 0.35 or greater relative to silica. Some discussion of the concept of NA may be useful.

The NA of an optical fiber is a measure of the "acceptance angle" of the fiber. The fiber can guide light that enters the end of the core of the fiber within this acceptance angle; light that enters the end of the fiber at an angle that is larger than the acceptance angle can be lost, such as by escaping into the cladding. Thus the end of a fiber can be imagined to have a cone emanating therefrom. Light that enters in a direction that is within the cone will propagate along the fiber. Light outside the cone will not propagate. The larger the NA, the wider the cone. In many applications it is advantageous for an optical fiber to have a high NA. For example, medical and industrial lasers typically provide rather high powers and use an optical fiber to deliver light energy from the laser to a work object. The flexibility, low weight, and relatively small dimensions of an optical fiber provide considerable advantages for directing the light from the high power laser to the work object. However, such high power sources often provide an output beam that has less than optimal beam quality. Such beams can be divergent and/or difficult to focus. A higher NA allows the fiber to capture more of the light launched onto an end face of the fiber from the high power source. Less light is lost, thereby increasing the efficiency of the overall optical apparatus. Also, the higher NA reduces the potential for damaging the fiber, as any power that is lost is typically absorbed by the cladding(s) of the fiber, resulting in considerable heat dissipation that can damage the cladding(s).

One mathematical formula for the NA of a first region of a waveguide relative to a second region of a waveguide takes the square root of the difference of the squares of the indices of refraction of two regions:

$$NA=[(1^{st} \text{ region index of refraction})^2-(2^{nd} \text{ region index of refraction})^2]^{1/2}$$

As understood by one of ordinary skill in the art, the foregoing formula is most accurate for a step index fiber, and for other fibers a different formula or actual measurements may be appropriate, but the foregoing formula is generally qualitatively accurate in that it indicates a larger index difference between two regions provides a larger NA. As one example where a different formula is appropriate, known in the art are certain types of fibers wherein the cladding or core comprises more than a single index of refraction, that is, the index of refraction is not constant throughout the core or cladding, such as in a fiber comprising a graded index core. As other examples, known in the art are microstructured or holey fibers or other fibers that are based on photonic bandgap phenomena or that have regions of different index of refraction that are arranged so as to produce an average index of refraction.

Plastic claddings, such as, for example, claddings that comprise fluorinated or perfluorinated polymers, are relatively easily applied to glass fiber and are very desirable because they can provide in many instances an increased NA. "Hard polymers", such as polymers used on the Hard Clad Silica (HCS) optical fiber available from the Optical Fiber Systems division of Furukawa Electric (OFS) and the TECS polymer available from the 3M Company are known in the art. For example, the foregoing HCS and TECS polymers are, according to their respective manufacturers' data sheets, capable of providing a NA of greater than 0.35 relative to a pure silica glass core. Hard polymers are well known in the art and are reviewed in an article entitled "Hard Polymer Claddings: Nearing Two Decades Of Performance", by Bolesh J. Skutnik, and published as Chapter 9 of the American Chemical Society Symposium Series 795, entitled "Optical Polymers, Fibers and Waveguides", edited by Julie P. Harmon and Gerry K. Noren, 2001. The foregoing Skutnik article is incorporated by reference herein to the extent necessary to understand the present invention.

With reference again to FIG. 3, the cladding 44 typically comprises a hard polymer and has a thickness, indicated by reference numeral 48, of approximately 25 microns. A buffer 50, having a thickness, indicated by reference numeral 52, of approximately 25 microns, surrounds the plastic cladding 44. The buffer 50 can be a Tefzel (a well known fluorine-based thermoplastic) buffer. The cladding 44 comprising a hard polymer is typically added to the fiber 40 using a die coater mounted on a draw tower on which the fiber 40 is being drawn. Typically the polymer is cured using appropriate actinic radiation, such as ultraviolet (UV) light provided by an apparatus mounted on the draw tower. The foregoing dimensions for thickness and diameters are exemplary, and as is known in the art a wide variety of fibers having various thicknesses and diameters are available.

In one specific prior art fiber, the cladding 44 comprises TECS material, available from the 3M Company, described in the 3M Power Core Fiber Products Catalog, dated 1995, No. 78-6900-3459-6, Revision A. The TECS material described in the aforementioned catalog is to the Applicants' knowledge still very popular and in wide use, and, as stated in the catalog, has been available since 1988. The TECS coating can contactingly surround the core 42 of the fiber 40, as shown in FIG. 3, or can be an outer cladding that contactingly surrounds an inner cladding (not shown in FIG. 3), that in turn contactingly the surrounds the core 42. In this instance, the inner cladding has an index of refraction that is less than the index of refraction of the core 42 and the outer cladding has an index of refraction that is less than the index of refraction of the inner cladding. The foregoing fiber is known as a double-clad fiber and is described in more detail below in the context of the present invention. TECS coatings are described at least on pages 1–3 and 6–7 of the aforementioned catalog. In one instance the fiber 40 can be 3M part no. FT-1.5-UMT (High OH), described in the table on pages 2–3 of the catalog.

In another specific prior art fiber, the cladding 44 comprises the "HCS" material available from Spectran Corporation of Avon Conn. and Sturbridge Mass., (now part of the OFS division of Furukawa). HCS fibers are described in the 2001 Specialty Fiber Technologies Catalog from Lucent Technologies (Lucent Technologies purchased Spectran, and then sold its optical fiber operations to Furukawa, such that Spectran became part of the OFS division of Furukawa). See pages 44–52 of the foregoing catalog, describing multimode step index fibers, as well as other sections of the catalog. More specifically, the prior art fiber 40 shown in FIG. 3 can be Spectran part no. HCP-M1500T (Low OH).

Prior art polymer or plastic clad fibers, and in particular the foregoing prior art TECS and HCS optical fibers, are extremely popular and have found many uses in the industry.

A multimode fiber can propagate a number of modes, each of which has a different spatial intensity distribution. Some modes will have an intensity peak at the center of the fiber, whereas other modes can have higher intensity at regions away from the center of the fiber. The beam intensity profile of light propagated by the fiber at a given length along the fiber results from the combination of the various modes propagating along the fiber, where each mode has a particular spatial intensity distribution and carries a particular amount of power (e.g., some modes may be more highly energized than other modes). If a multimode fiber is long enough, the beam profile at or near the output end of the fiber, even given a Gaussian illumination of the core at the input end of the fiber, tends toward a top hat profile due to a natural mixing of power between all of the modes due to stresses, imperfections, bends and the like in or imposed on the fiber. For shorter lengths, the beam at or near the output of the fiber may be more of a Gaussian beam profile. However, it can be desirable for a shorter length of fiber to more readily provide a top hat profile, or for a longer length to provide a Gaussian, or to have a given length of fiber provide a ring shaped profile. In general, it may be desirable to exercise some control over the beam profile, rather than just work with what naturally occurs for a given length of fiber. According to one aspect of the invention, the core can include provision for affecting the distribution of power amongst the modes, such as, for example, by selecting an index of refraction profile of the core of the fiber that favor a selected beam profile, typically by tending to concentrate energy in certain modes or, as another example, by tending to distribute energy more evenly amongst the modes.

Figure 4:
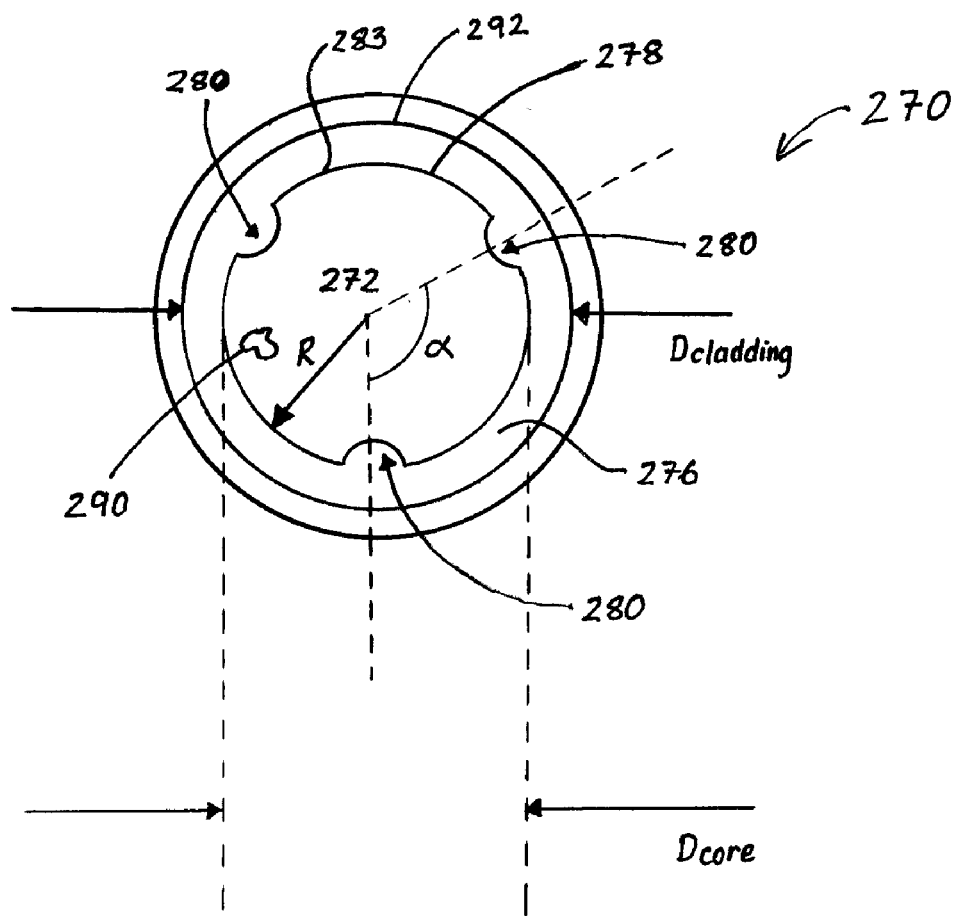
FIG. 4 schematically illustrates an optical fiber according to the invention.

With reference to FIG. 4, in one aspect the invention provides an improved optical fiber 270 for the delivery of optical energy to or from a work object. The fiber comprises a core 272, which can be a multimode core, comprising a diameter $D_{core}$ and a cladding 276 disposed about the core 272. The core 272 comprises a selected numerical aperture relative to the cladding 276, and the cladding 276 further comprises an outer diameter $D_{cladding}$. In one practice of the invention, the ratio $[D_{cladding}/D_{core}]^2$ is no greater than 1.5. In this instance, if one or both of the diameters and $D_{core}$ and $D_{cladding}$ have a maximum and a minimum value, the maximum value is used in the foregoing formula. For example, should the cladding have a rectangular shape, the largest diameter, which would be the diagonal, would be used in the foregoing formula. Alternatively or additionally to the fiber 270 comprising the foregoing ratio, the core can comprise a diameter $D_{core}$ that is at least 250 microns, at least 500 microns, or at least 700 microns.

The core 272 can comprise one or more provisions for affecting the power distribution amongst the modes propagated by the core 272 of the fiber. Such provision can include the outer perimeter 278 of the core 272 being non-circular. For example, as shown in FIG. 4, the fiber 270 can comprise an outer perimeter 278 that includes sections 280 that can be inwardly oriented (e.g., curved inwardly) as shown in FIG. 4, or flat, or outwardly oriented, or any other shape that causes mixing of the power of modes propagated by the core 272. Typically, this means that not all of the length of the outer perimeter 278 conforms to a circle having the radius R. The section 280 can comprise an outward curvature, where the outward curvature has a radius of curvature that is different than the radius of curvature R of the section 283, which is also outwardly curved, of the outer perimeter of the fiber 270.

The outer perimeter 278 can also have a variety of other shapes, such as a square, rectangle, polygon, ellipse and an arbitrary shape. Preferably, however, the outer perimeter 278 conforms to a circle having a substantially constant radius R along a majority of the length of the outer perimeter. In one practice, the outer perimeter 278 conforms to a circle having a substantially constant radius R along at least 75% of the length of the outer perimeter. In another practice, the outer perimeter conforms to a circle having a substantially constant radius R along at least 90% of the length of the outer perimeter. Conforming to a circle having substantially constant length can help, in some circumstances, with one or more of connectorizing, measuring or splicing the fiber.

Provision for affecting the power distribution amongst the modes can also include the core comprising at least one region 290 comprising an index of refraction that is different than the index of refraction of at least a portion of the core 272 contacting the region. The region can extend along a longitudinal axis (i.e., into the page of FIG. 4) and be coextensive, with for example, the core 272. The region 290 can comprise a void, which can be empty or filled in whole or part with a selected gas or liquid. Alternatively, the region 290 can comprise discrete regions that are truncated along the longitudinal direction, and hence not coextensive in the longitudinal direction with the core 272. For example, the region 290 can comprise a bubble. In another practice, the core 272 can be twisted, or spun, as it is drawn from a preform. For example, the preform can be rotated in one direction or turned back and forth as fiber is drawn from the preform, or alternatively or additionally, the fiber can be rotated or twisted back and forth. Techniques for spinning are known in the art. See, for example, U.S. Pat. Nos. 4,473,273, 5,298,047 and 5,418,881.

The core 272 can comprise a glass. For example, the core 272 can consist of silica, consist essentially of silica, or can comprise substantially pure silica. The fiber 270 can comprise an index of refraction profile of the core 272 relative to the cladding 276, which index of refraction profile can comprise a step index of refraction profile. The index of refraction profile of the core 272 relative to the cladding 276 can comprise profiles other than a step profile, such as, for example, a graded index of refraction profile, a reverse graded index of refraction profile, a generally concave profile, and a profile having raised regions. Some of these profiles are discussed in more detail below.

The cladding 276 can comprise a polymer, such as a "hard" polymer as that term is understood by those of ordinary skill in the art (e.g., the HCS or TECs polymers described elsewhere herein and in the Skutnik article), or a soft polymer, where soft, as that term is used herein, means a polymer having a modulus no greater than 500 MPa. In other practices of the invention, a polymer can have a modulus of no greater than 300 MPa; of no greater than 200 MPa; of no greater than 100 MPa; or no greater than 50 MPa; of no greater than 10 MPa; of no greater than 5 MPa; or of no greater than 2 MPa.

"Modulus", as used herein, means the segment modulus according to the test regime used, for example, by the DSM Desotech Company as described in the data sheet dated April 2003 for Desolite 3471-1-152A. Additional information can be found in the DSM Desotech 2001 product catalog. In such a test regime, the segment modulus is calculated by dividing stress by applied strain at 2.5% elongation. A least squares fit is applied to the data points up to 2.5% strain. If segment modulus cannot be measured or is clearly not appropriate, secant modulus can be used, where the first data point is set at the origin.

According to DSM Desotech, the test is performed on approximately 75 micron thick films cured in nitrogen at 1.0 $J/cm^2$ using one D lamp. The UV dose can be determined with a radiometer, such as an IL-390 radiometer manufactured by International Light, Inc. Films should be uniform in thickness and uniformly cured, and precautions taken to minimize film defects that can arise from bubble or dust particle entrapment. Films can be cast with an automatic draw down apparatus, such as a Garner Mechanical Drive # AG-3860, equipped with an applicator, such as a 6 inch wide, 0.006-inch wide film thickness Bird Bar Applicator. The light source for curing can be a Fusion Systems Model DRS 120 equipped with a medium pressure D electrodeless/air cooled lamp where the lamp is focused. The light source can be of 300 watts (120 watts/cm) and an appropriate conveyer speed of from 15 ft/min to 150 ft/min can be selected by one of ordinary skill in the art. A freshly cleaned flat surface such as a glass plate or release paper can provide a substrate that generally produces satisfactory specimens. An Instron Universal Testing Instrument can be used to test a free 75 micron thick film conditioned for 16 hours at (and tested at) 23 Celsius and 50% relative humidity, with a specimen dimension of 1.3×12.7 cm, a gauge length of 5.1 cm and strain rate of 50% elongation per minute.

An optical fiber according to the invention can include a region disposed about a cladding comprising a soft polymer where the region comprises a polymer having a modulus that is greater than the modulus of the soft polymer. For example, such a region could comprise a polymer having a modulus of no less than 700 MPa.

The cladding 276 can comprise a glass, such as a silica glass. The cladding 276 can comprise a selected index of refraction, and the fiber 270 can comprise a second cladding 292 disposed about the cladding 276, where the second cladding 276 comprises an index of refraction that is less than the selected index of refraction.

The sections 280 shown in FIG. 4 can be evenly spaced by the angle $\alpha$. Preferably the angle $\alpha$ is equal to approximately 120 degrees. Preferably a majority of the length of said outer perimeter 278 conforms to a circle having a substantially constant radius.

Figure 5:
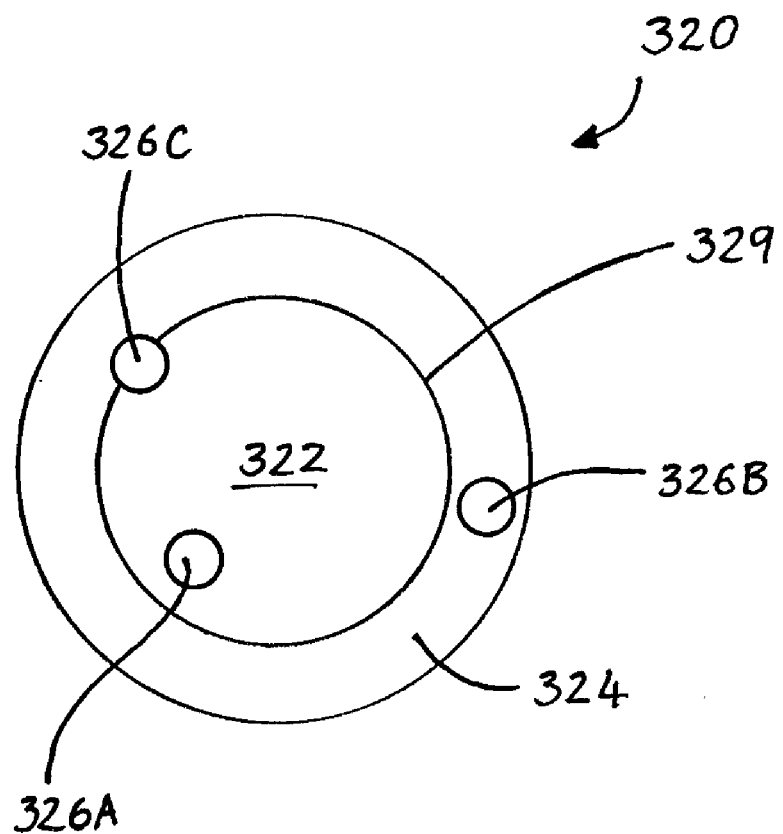
FIG. 5 schematically illustrates a cross section of at least part of a preform adapted for drawing a fiber having one or more of the features of the fiber of FIG. 4.

FIG. 5 illustrates one technique for providing an optical fiber comprising provision for promoting energy transfer between modes propagated by the core. FIG. 5 illustrates in cross section a preform 320 from which such an optical fiber can be drawn. Holes 326A–326C can be drilled into the preform 320 prior to drawing of the preform, such as by an ultrasonic drilling technique. As the preform 320 is drawn, material of the core region 322 and/or the cladding region 324 flows to fill the holes, shaping the outer perimeter of the core.

Typically, one or more (or all) the holes will be drilled in the same region of the fiber. Holes drilled in different regions are shown in FIG. 5 to illustrate some of the different locations in which holes can be drilled. The core region 322 comprises the hole 326A, the cladding region comprises the hole 326B, and hole 326C encompasses, at least in part, the core/clad interface 329. The hole 326A can create an inwardly curved section, such as one of the sections 280 shown in FIG. 4; the hole 326B can create a section having an outwardly curved surface, and the hole 326C can create an S-shaped or irregularly shaped section in the outer perimeter of the core.

Note that rods or other material comprising an index of refraction that is different than the index of at least some of the core material that will contact the rod (after it is inserted in the hole) can be placed in the holes 326A–C for creating longitudinally extending scattering regions (see 290 in FIG. 4) that promote the exchange of energy between modes propagated by the core of the resultant fiber drawn from the preform.

By properly selecting the diameter of one or more of the holes 326A–C and/or the conditions under which the fiber is drawn, the holes can remain partially open for providing a longitudinally extending empty region or void in the resultant drawn fiber. Thus the region 290 shown in FIG. 4 can be empty, or comprise a gas, such as air, or even be filled with a liquid after the fiber is drawn. One of ordinary skill in the art, in light of the disclosure herein, will appreciate that techniques taught in U.S. Pat. No. 6,483,973 can be applied to the present invention. For example, the core of a fiber can be drawn from a rod placed in a tube, where the rod has been ground to produce a flat. In this instance the region 290 of the core 272 of the drawn fiber 270 can comprise a longitudinally extending region having a crescent shape.

Certain patents may disclose techniques that can be adapted by one of ordinary skill, apprised of the present disclosure, for use in practicing the present invention; see for example the following US patents: U.S. Pat. No. 4,815,079, issued to Snitzer et al. and entitled "Optical Fiber Lasers and Amplifiers"; U.S. Pat. No. 5,533,163, issued to Muendel and entitled "Optical Fiber Structure for Efficient Use of Pump Power"; U.S. Pat. No. 5,864,645, issued to Zellmer et al. and entitled "Double-Core Light-Conducting Fiber, Process for Producing the Same, Double-Core Fiber Laser, and Double-Core Fiber Amplifier"; U.S. Pat. No. 5,873,923, issued to DiGiovanni and entitled "Method of Making a Cladding Pumped Fiber Structure"; U.S. Pat. No. 5,949,941 issued to DiGiovanni et al, and entitled "Cladding-Pumped Fiber Structures"; U.S. Pat. No. 5,966,491, issued to DiGiovanni and entitled "Cladding-Pumped Fiber Structure"; U.S. Pat. No. 6,115,526, issued to Morse and entitled "Ultra High Numerical Aperture High Power Optical Fiber Laser"; U.S. Pat. No. 6,157,763, issued to Grubb et al. and entitled "Double-Clad Optical Fiber With Improved Inner Cladding Geometry"; and WO 99/30391, in the name of Anthon et al., and entitled "Double-Clad Rare Earth Doped Optical Fibers". See also U.S. Pat. No. 6,477,307, entitled "Cladding Pumped Optical Fiber and Methods for Fabricating", issued to Tankala et al., and U.S. Pat. No. 6,483,973, entitled "Cladding Member for Optical Fibers and Optical Fibers Formed with the Cladding Member", issued to Mazzarese et al.

The foregoing patents are considered to disclose techniques for providing mode mixing in the multimode cladding of a double clad fiber, such as, for example, shaping the outer perimeter of cladding of an optical fiber, and methods for modifying the outer perimeter to have such shapes. One of ordinary skill the art, apprised of the disclosure herein, can envision adapting one or more of techniques taught in the foregoing patents to the core of a fiber according to the invention, and such adaptation is considered within the scope of the present invention. Other techniques, such as, for example, twisting a fiber to promote mode mixing, are within the scope of the present invention.

Each of the foregoing patents is herein incorporated by reference to the extent necessary to practice the present invention and to the extent that it does not conflict with the teachings herein.

Optical fibers according to the invention can be used in a variety of applications. In many instances it can be desirable to provide a beam having a particular beam profile for a particular application. A Gaussian beam profile 34 and a top hat beam profile 32 are discussed above in conjunction with FIG. 2. Other beam profiles include a profile that is selectively flattened to various degrees and a profile that has two spaced peaks with an intensity in the center of the beam that is less than either of the intensities at the peaks. The latter can be useful for cutting metal.

Figure 6:
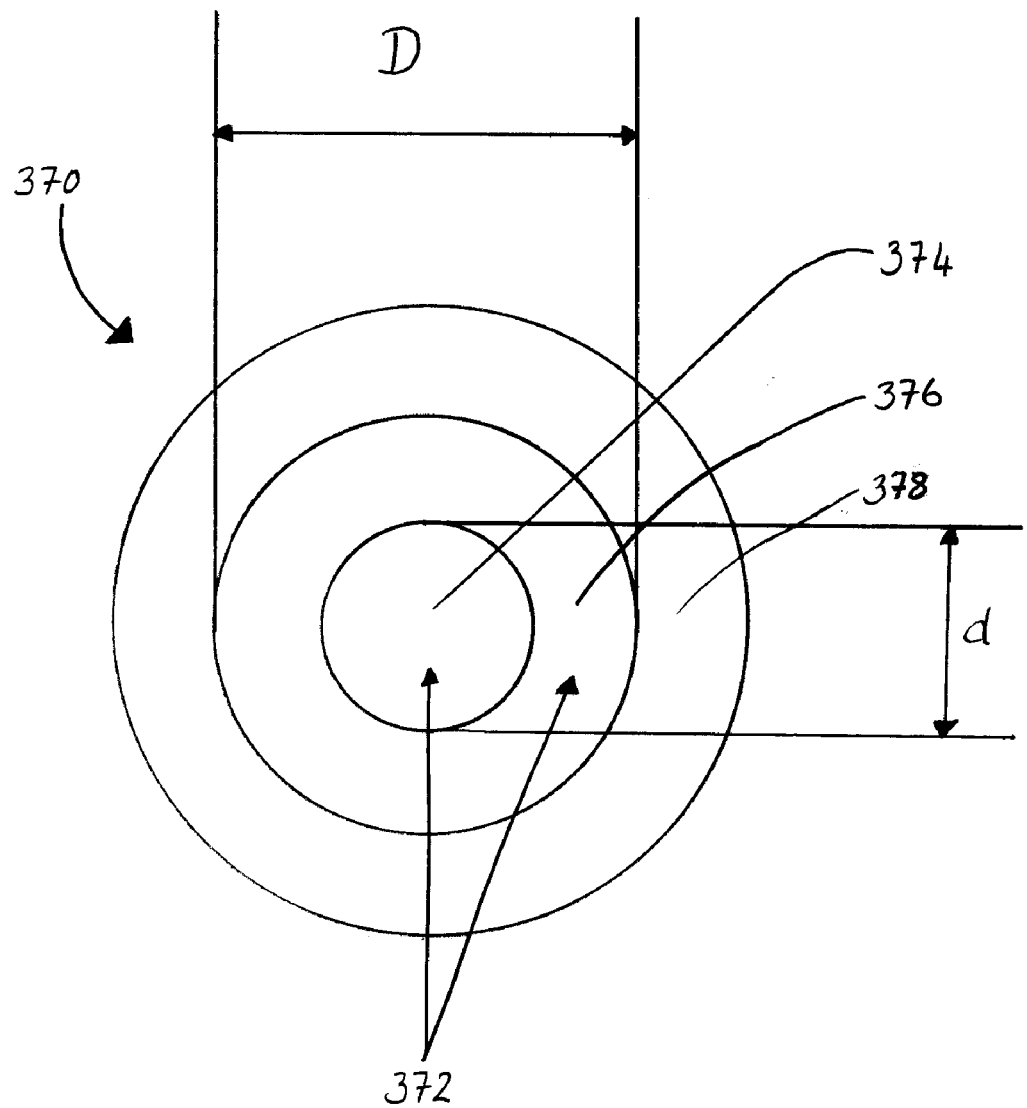
FIG. 6 schematically illustrates a cross section of an additional optical fiber according to the present invention.

With reference to FIG. 6, which shows the optical fiber 370 in cross section, the Applicants' invention can provide an optical fiber 370 comprising a core 372, which can be a multimode core, where the core 372 comprises an inner region 374 comprising a first index of refraction and a second region 376, disposed about the inner region 374. The second region 376 comprises a second index of refraction that is greater than the index of refraction of the inner region by an amount $\Delta$, which can be, by way of example and not of limitation, at least 0.0001; at least 0.0002; or at least 0.0003. The fiber 370 can also comprise a cladding 378 disposed about the core 372, where the cladding 378 comprises a third index of refraction that is less than the first index of refraction and less than the second index of refraction. The cladding 378 can comprise an index of refraction, and $\Delta$ can be at least 1/10 (one tenth) of the difference between the highest index of refraction of the core 372 and the index of refraction of the cladding 378. In other practices of the invention Δ can be at least ⅑ (one ninth) or at least ⅛ (one eighth) of the difference between the highest index of refraction of the core 372 and the index of refraction of the cladding 378.

The fiber 370 can comprise one or more of the following: the core can comprise a diameter D of at least 250 microns, 500 microns, 700 microns, or 1000 microns; the core can comprise substantially pure silica; the inner region 374 can consist essentially of silica; the second region 376 can consist essentially of silica; and the second region 376 can comprise an annulus throughout which the second index of refraction is substantially the same.

In one aspect of the invention, the inner region 374 can comprise a diameter d and the annulus can comprise an outermost diameter D. The diameter d can be greater than the difference between the outermost diameter and the diameter, namely D-d, which corresponds to the thickness of the annulus of the second region 376.

Figure 7A:
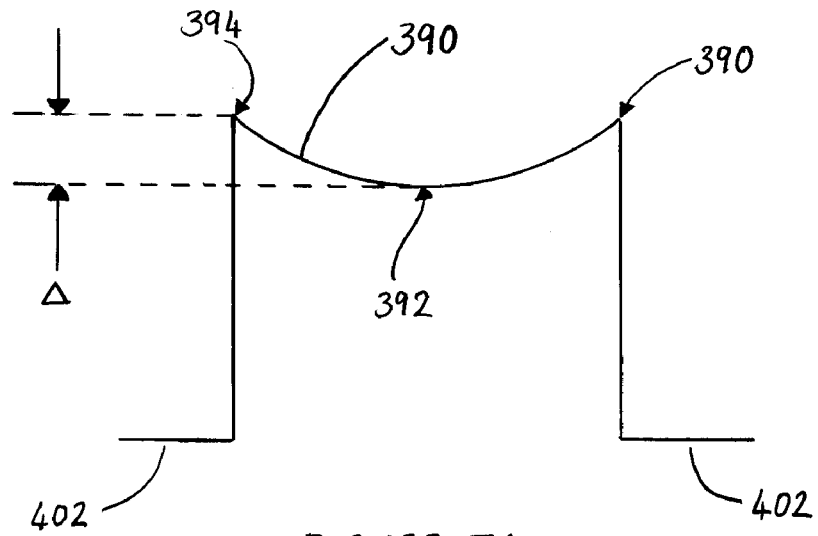
FIG. 7A schematically illustrates one possible index of refraction profile for a fiber such as the fiber shown in FIG. 6.

FIG. 7A illustrates one possible index of refraction profile 390 of core 372 and at least a part of the cladding 378 of one fiber 370 according to the invention. The index of refraction profile 390 of the core 372 comprises a generally concave shape.

The index of refraction profile 390 comprises a portion 394, corresponding generally to the second region 376 of the optical fiber 370, and a portion 392, corresponding generally to the inner region 374 of the optical fiber 370. The portion of the index of refraction profile 390 indicated by reference numerals 402 corresponds to a portion of the cladding 378.

Reference numeral 400 indicates that the transition from the core 372 to the cladding 378 is steep, as in a step index of refraction profile, though the steep transition 400 is exemplary, and the invention can be practiced with a more gradual transition.

The index of refraction profile 390 can be formed via reverse grading when forming the preform from which the fiber 370 is to be drawn. A reverse graded index profile is different from a normal graded index fiber, wherein the core of the fiber comprises an inner region having a higher index of refraction than an outer region disposed about the inner region. One common normal graded index of refraction profile includes a parabola, as is well appreciated by those of ordinary skill in the art.

Figure 7B:
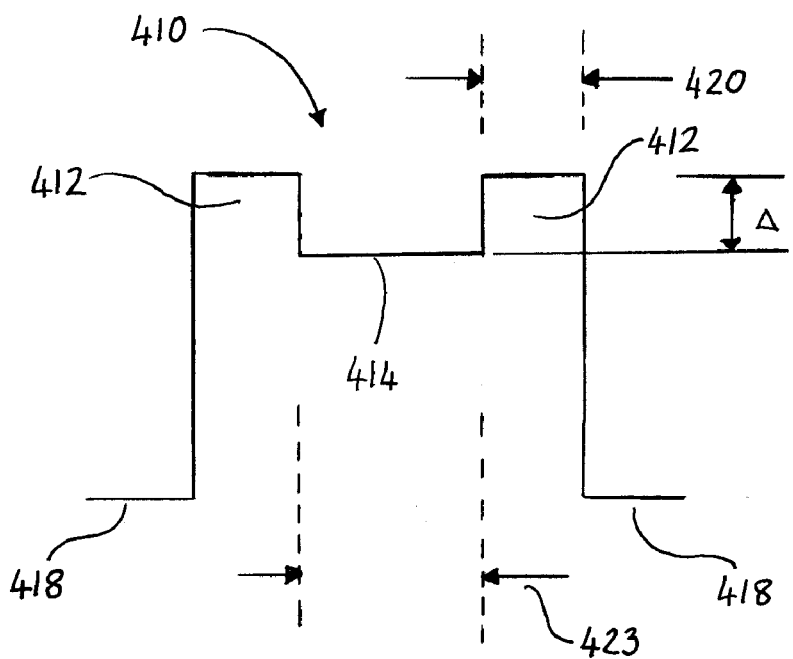
FIG. 7B schematically illustrates another possible index of refraction profile for a fiber such as the fiber illustrated in FIG. 6.

With reference to FIG. 7B, as another example, a fiber according to the invention can comprise a core, which can be a multimode core, which can comprise a refractive index profile indicated generally by reference numeral 410 comprising a pair of outer sections 412 separated by an inner section 414 located between the pair of sections 412. Each of the pair can comprise an index of refraction that is raised relative to the index of refraction of the inner section 414 by at least an amount Δ which can be selected as noted above. The fiber can also comprise a cladding disposed about the core, where the cladding comprises an index of refraction, indicated by reference numeral 418, that is less than the indices of refraction of the pair and the inner section 414. Each of the pair can comprise a width, one of which is indicated by reference numeral 420, where each of the widths is less than the width 423 of the inner section 414 located between the pair of sections 412. For example, in one practice of the invention, each of the widths is no greater than ⅕$^{th}$ of the width of the inner section 414. As one example, the width of the inner section can comprise at least 250 microns. In one aspect of the invention, the portion 374 of the core 372, which corresponds to the inner section 414, consists essentially of silica. Note that the index of refraction of the inner section 414 can be substantially constant, as shown in FIG. 7B, and that the indices of refraction of the pair of sections 412 can also be substantially constant. Preferably the indices of refractions of each of the sections 412 are substantially the same, and preferably the widths of each of the sections 412 are substantially the same.

Figure 8:
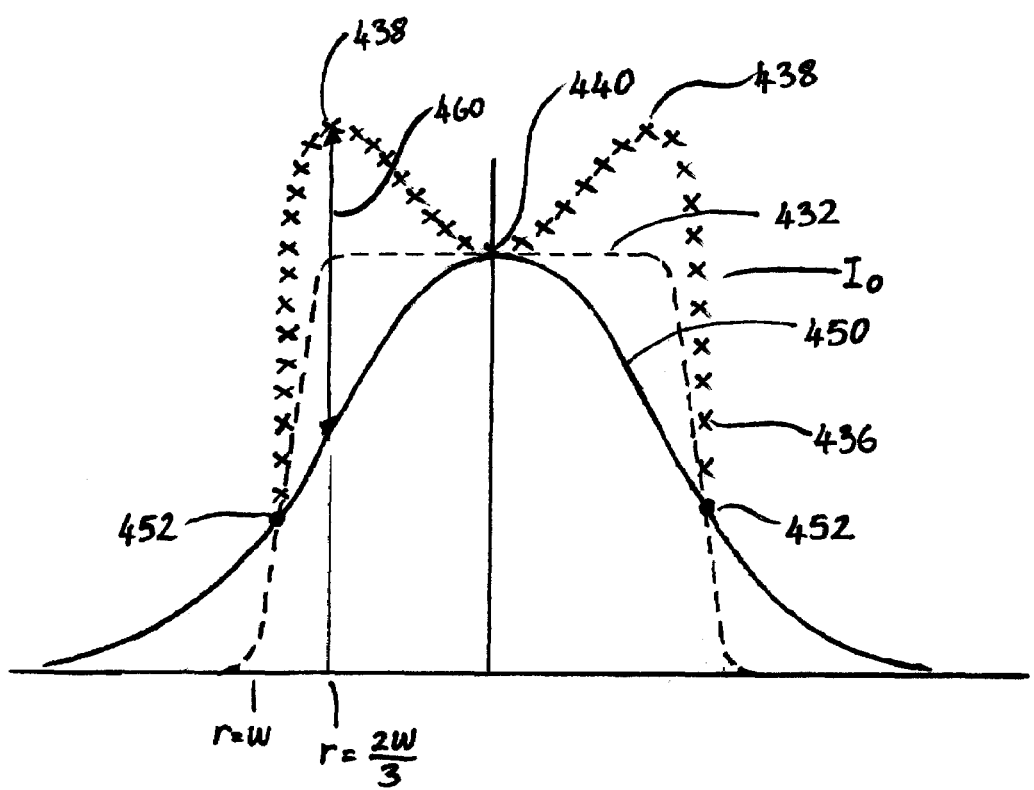
FIG. 8 schematically illustrates various intensity profiles that can be delivered to a work object by selected fibers made and/or used according to the invention.

The invention also includes methods. In one aspect the invention provides a method of providing a selected intensity profile of an optical energy beam that can be propagated by an optical fiber for delivering optical energy to or from a work object. The method comprises determining an acceptable beam intensity profile and providing an optical fiber for propagating optical energy having the acceptable beam intensity profile. An acceptable beam profile can comprise, for example, the ideal top hat profile 32 illustrated in FIG. 2, or, with reference to FIG. 8, the flattened profile 432 or the ring profile 436. Providing the optical fiber can comprise forming a multimode core comprising an index of refraction profile, such as, for example, one of the index of refraction profiles 390 and 410 shown in FIGS. 7A and 7B respectively, where the index of refraction profile comprises an inner region comprising an index of refraction and outer regions disposed about the inner region and having indices of refraction that are raised relative to the index of refraction by at least an amount Δ; disposing a cladding about the core, where the cladding comprises an index of refraction that is lower than the indices of refraction of the outer regions and the index of refraction of the core; and selecting Δ so as to contribute to providing the acceptable beam intensity profile. The acceptable beam profile can comprise two peaks, such as, for example, the peaks 438 of the profile 436 shown in FIG. 8, where each peak is spaced from the center 440 of the profile 436 and of higher intensity than the center of the profile. The acceptable beam profile can comprise a minima at the center of the beam profile, such as the minima at 440 in FIG. 8.

With reference again to FIG. 8 as one example, in another aspect of the invention, a fitted beam profile 450 is fit to the acceptable beam intensity profile using the parameters $I_o$ and w and the formula $I(r)=I_o e^{-2(r/w)^2}$, which is one formula for a Gaussian power distribution, where $I_o$ is the intensity at the center of the beam (e.g., at 440), w is a radius at which the beam has an intensity of $I_o/e^2$ (e.g., at the locations 452), and I(r) is the intensity of the fitted beam as a function of beam radius (e.g., the curve 450). The acceptable beam intensity profile has an intensity $I_b$ at a radius r=2w/3 that is greater than the intensity $I_g$ of the fitted beam profile at r=2w/3, as indicated by reference numeral 460. In other examples, $I_b$ can be at least 1.2 times $I_g$, at least 1.3 times $I_g$, at least 2.0 times $I_g$ or at least 2.25 times $I_g$. The method can also comprise propagating the beam along the optical fiber for delivery of the beam to or from a work object.

As noted above, it is often very advantageous that an optical fiber have a high NA. Accordingly, in the prior art polymer materials having a large delta (much larger than that obtainable using a glass cladding) relative to silica are used as claddings that contactingly surround a silica core to provide a fiber having a high NA. The prior art teaches that hard polymers are the best for this type of fiber, as hard polymers allow the use of strip and cleave techniques for connectorizing the fiber, and it has been considered that connectors are best mounted to hard material, which, in the absence of mounting the connector to glass, meant that the connector should be mounted to a hard polymer. However, the polymer cladding, when contacting and surrounding the silica core, is exposed to a portion of the power that is propagated by the fiber, especially when the fiber is bent, and, any defects in the polymer, which can take the form of a delaminated area, cracking, glazing, foreign matter or other inhomogeneous region that can absorb power can then more readily contribute to the failure of the fiber.

In certain instances fibers of the type described above are prone to failure. For example, the present Applicants analyzed fiber used by a manufacturer who has experienced repeated failures of the foregoing fibers, either under test (after the fibers had been assembled into expensive probes) or in the field when the fibers (again after assembly into a probe) were being used. Five to ten percent of the fibers provided with a laser apparatus, such as the apparatus 20 schematically illustrated in FIG. 1, can fail in a catastrophic fashion, typically early in the expected lifetime of the fiber probe. The fibers explode loudly and are often severed at the site of the explosion. When used in the field, such catastrophic failure startles the user and patient. The device manufacturer introduced more rigorous test procedures in an attempt to screen out fibers that would fail in the field. Such testing may be an improvement, but does not screen out all fibers that will fail in the field, and is time consuming and laborious, in addition to requiring that the fiber be assembled into a full probe. "Probe" is used herein to mean a fiber that has been "connectorized" so as to include an input connector, such as the connector 36 shown in FIG. 1, and an output element, such as the element 28 shown in FIG. 1. In addition a fiber that has been assembled into a probe typically also includes upjacketing to further strengthen the fiber. For example, a nylon tube may be slipped over the Tefzel buffer layer.

The present Applicants studied several failed glass core fibers having a polymer cladding. The sample fibers studied were understood to have failed catastrophically when in use or under test prior to be shipped to a customer, and were used in a medical environment to deliver laser light to a patient. The fibers studied comprised a silica core having a 1500 µm diameter, surrounded by a 25 µm thick hard polymer material (either HCS or TECS), which was in turn surrounded by a 225 µm thick Tefzel® buffer. The HCS or TECS materials provided an NA of at least 0.35.

Figure 9A:
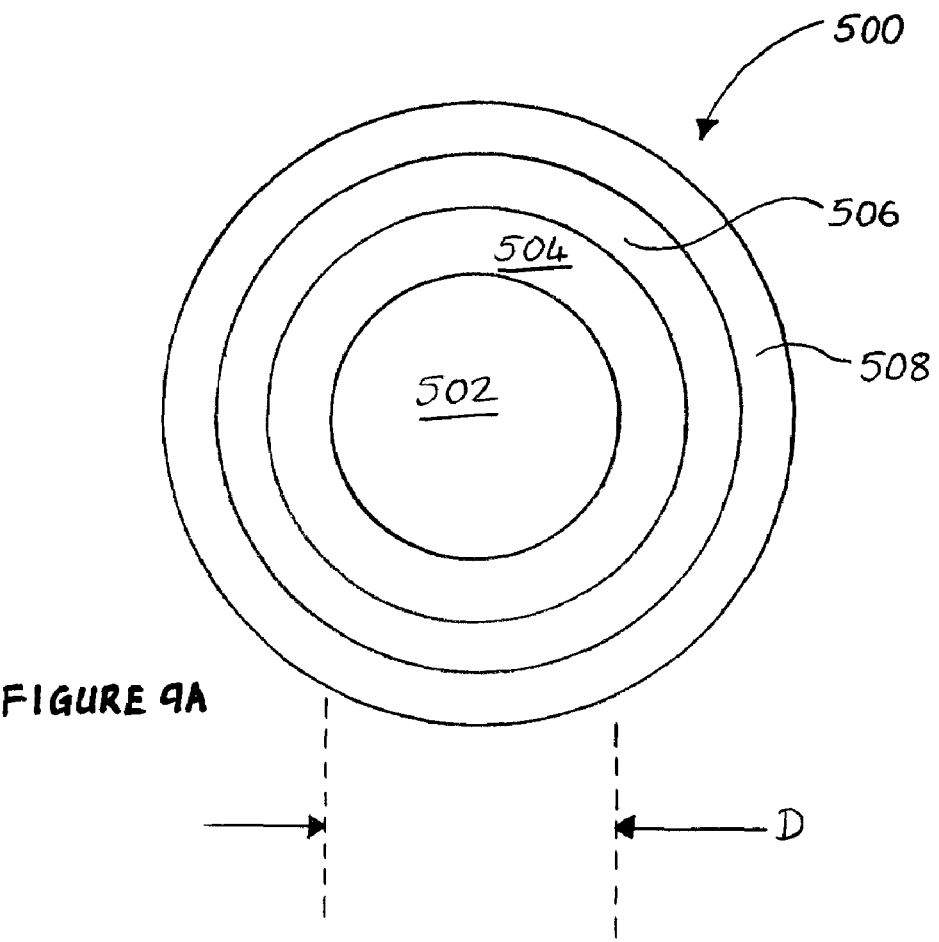
FIG. 9A schematically illustrates a cross section of yet another fiber according to the invention.

Accordingly, in one aspect of the present invention, fibers are adapted to avoid or reduce the incidence of such failures Accordingly, with reference to FIG. 9A, one aspect of the invention comprises a fiber 500 comprising a glass core 502 and a cladding 504, which preferably comprises a glass, disposed about the glass core 502. The glass core 502 comprises an index of refraction, and the glass cladding 504 comprises a selected index of refraction that is less than the index of refraction of the core 502. The fiber 500 comprises a second cladding 506 disposed about the cladding 504, where the second cladding 506 comprises a polymer with a second selected index of refraction that is less than the selected index of refraction comprised by the cladding 504.

The invention resides in the claims appended hereto or later added, and explanations disclosed herein are by way of example and not intended to be limiting.

Accordingly, without intending to be bound by any particular theory, the use of two claddings is understood to reduce the power to which any one cladding is exposed, such that any defects in either of the claddings, and in particular in any polymer cladding, are less likely to absorb power and cause a thermal breakdown and hence failure of the fiber. The claddings share the burden of tending to confine light to the core such that the fiber can guide the light. In sharing, the burden on any one cladding is reduced. However, the effective NA of the optical fiber can be somewhat reduced over that which could obtained if the second cladding were to contactingly surround the core directly, without the first cladding in between. For example, if the core 502 comprises an NA relative to the cladding 504 of 0.22, and the core 502 has an NA relative to the second cladding 506 of 0.4, the effective NA of the fiber is between 0.22 and 0.4, and is hence between 0.22 and 0.4, as opposed to the NA of 0.4 that could be obtained for the fiber if the cladding were eliminated and the second cladding 506 contactingly surrounded the core 502.

Preferably, the second cladding comprises an optically cured polymer. As used herein, an "optically cured polymer" is a polymer made by the process of exposing a precursor of the polymer to electromagnetic radiation (which can be light including, but not limited to, ultraviolet light) causing polymerization and/or cross linking to form the cured polymer. Polymerization can occur through the formation of radicals (e.g., free-radical polymerization) or another mechanism, and/or cross-linking can occur through radical formation upon excitation of unsaturated polymer chains, or another mechanism. Optically-cured polymers useful in the invention need not be fully optically cured, i.e., all precursor sites that can participate in polymerization and/or cross linking need not have undergone polymerization or cross linking reaction. Typically, at least 50%, 70%, or 80% of such sites will have reacted. Such optically-cured polymers are well known to those of ordinary skill in the art. See, for example, the Desolite 3471-1-152A polymer noted above.

Preferably the polymer is at least 80% cured (i.e., 80% of the aforementioned sites have reacted). Soft polymers are understood to be more resistant to one or more of the cracking, crazing and/or delamination that is understood to contribute to or that may be wholly responsible for the failure of prior art fibers. One or all of the foregoing are understood to be detrimental. For example, defects, including particulate matter, can more readily propagate to the outer surface of the glass core, and lead to catastrophic failure of the fiber, as described above. According to the invention, a more robust fiber is thus provided.

By way of example and not limitation, a fiber according to the invention can further include one or more of the following features, as understood by one of ordinary skill in the art, in light of the disclosure herein, individually in combination: the fiber 500 can comprise an index of refraction profile of the core relative to the cladding, where the index of refraction profile comprises a step index of refraction profile. The cladding 504 can comprise a glass comprising fluorine or boron. The core 502 can consist of silica, consist essentially of silica, or comprise substantially pure silica. $D_{core}$ can be at least 250 microns, at least 500 microns, or at least 700 microns, and in certain practices it may be desirable that $D_{core}$ be no greater than 1000 microns. The core 502 and the cladding 504 can be drawn from a preform. The core 502 can comprise a diameter $D_{core}$ and the cladding 504 can comprise an outer diameter $D_{cladding}$ such that the ratio $[D_{cladding}/D_{core}]^2$ is no greater than 1.5. In evaluating the foregoing ratio, if one or both of the diameters $D_{core}$ and $D_{cladding}$ have a maximum and a minimum value, the maximum value is used. The fiber 500 can comprise a region 508 disposed about the second cladding 506, which region can comprise an index of refraction that is higher than the index of refraction comprised by the second cladding 506, such that any excess light in the second cladding is stripped from the second cladding. Stripping such light from the cladding should help avoid damaging heating of the second cladding that can lead to catastrophic failure of the fiber 500. Preferably the region 508 comprises an index of refraction that is higher than the index of refraction comprised by the core

502. The region 508 can comprise a hard polymer comprising the aforementioned indices of refraction. In another approach, the region 508 comprises an index of refraction that is lower than the index of refraction comprised by the second cladding 506. In this instance the region can comprise a hard polymer, such as, for example, an HCS or TECS polymer. The region 508 can comprise a silicone.

Figure 9B:
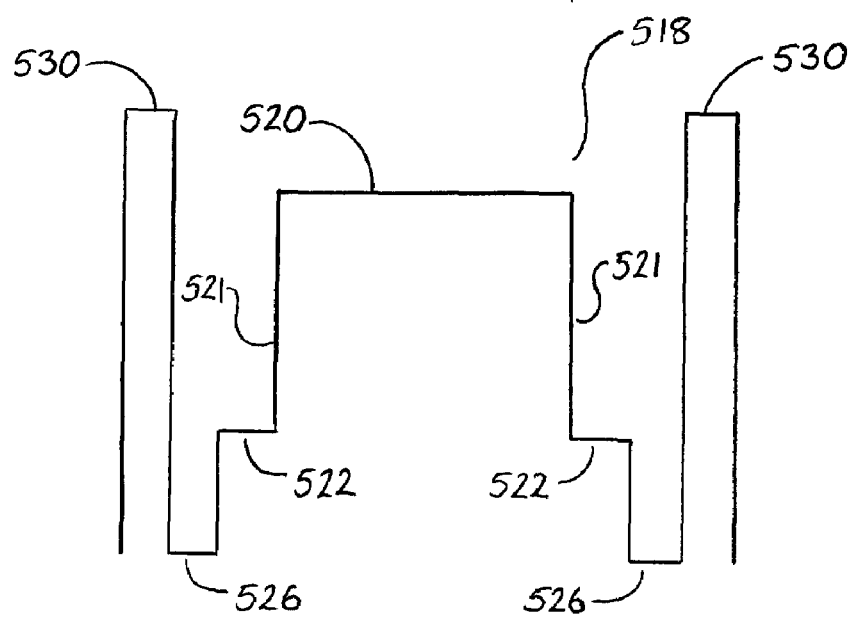
FIG. 9B schematically illustrates one possible index of refraction profile for the fiber illustrated in FIG. 9A.

In one instance, a fiber 500 can comprise the index of refraction profile 515 shown in FIG. 9B. As indicated by reference numeral 518, the core 502 can comprise a "step" index of profile of refraction relative to the cladding 504, wherein the profile 518 comprises a generally flat top 520, corresponding to a substantially constant index of refraction of the core 502, and generally steep transitions 521 from the core 502 to the cladding 504. One of ordinary skill in the art understands that such a "step" profile 518 of the core 502 relative to the cladding 504 is idealized, and that an actual step profile can include "signature" features characteristic of the particular technique used to manufacture the optical fiber. For example, when a fiber according to the invention is drawn from a preform (other techniques, such as the double crucible technique, can be used, as discussed below) and the preform from which the fiber is drawn is fabricated via Modified Chemical Vapor Deposition (MCVD), the actual step profile can include a center dip due to burnoff of material during collapse, as is well known in the art. As indicated by FIG. 9B, the cladding 504 comprises the index of refraction indicated by reference numeral 522, which in this example, is constant across at least one radial path across the cladding 504. Similar considerations apply to the second cladding 506, which comprises the index of refraction 526, and the region 508, which comprises the index of refraction 530.

The invention can also comprise methods. One method comprises providing a source of optical energy; providing an optical fiber as described herein (e.g., an optical fiber comprising a glass core, a glass cladding disposed about the core and a second cladding disposed about the cladding, where the second cladding comprises a soft optically cured polymer); receiving optical energy (e.g., at least one pulse of optical energy or a train of pulses) from the source and guiding the optical energy, such as the pulse or pulses) with the fiber, wherein the guided energy comprises a selected power level. For example, the at least one pulse can have a peak power of at least 5 kW. In other embodiments the pulse can have a peak power of at least 10 kW, at least 15 kW, or at least 20 kW. In yet additional embodiments, the fiber can receive an average power of at least 50 watts, of at least 100 watts, or at least 500 watts. In further embodiments, the fiber can receive an average power density of at least 2.9 kW/cm$^2$, an average power density of at least 4 kW/cm$^2$, an average power density of at least 6 kW/cm$^2$ or an average power density of at least 10 kW/cm$^2$.

Typically, pulses have a duration in the millisecond region, such as, for example, a duration selected to be from 0.1 milliseconds to 100 milliseconds; from 0.5 milliseconds to 10 milliseconds; or from 1 millisecond to 5 milliseconds. In one embodiment of the invention the pulse duration is approximately 3 milliseconds. The pulse repetition rate can be selected to be from 1 pulse per 5 seconds to 10 pulses per second. More typically the pulse repetition rate is approximately 1 Hz.

In certain practices, the source can comprise a laser and the pulse of optical energy can comprise a fundamental wavelength of from 200 nm to 2000 nm. The optical source can comprise, for example, one of an alexandrite laser and a Nd YAG laser. The second cladding can comprise an index of refraction, and wherein the fiber further comprises a hard polymer disposed about the second cladding, and the hard polymer can comprise an index of refraction that is higher than the index of refraction of the second cladding. The core can comprise a diameter of at least 250 microns. The core can comprise a step refractive index profile relative to the cladding. The core can consist of silica, can consist essentially of silica, or can comprise substantially pure silica. The optical fiber 500 can comprise an effective numerical aperture of at least 0.3. In one practice of the method, the optical source receives incident optical energy from a second optical source and responsive to the incident optical energy provides the optical energy received by the optical fiber.

Methods and apparatus for providing optical fiber are now reviewed. As is well understood by those of ordinary skill in the art, one technique for fabricating an optical fiber includes first making a preform and drawing the optical fiber from the preform. A preform is a large glass member (typically a cylinder) that can be heated at one end so as to cause the glass to flow such that it can be drawn, or pulled, into an optical fiber. The optical preform is typically a scaled up model of the optical fiber, and includes a core and cladding which become the core and cladding, respectively, of the resultant drawn optical fiber. Considerable care is taken in fabricating the preform to the ensure that the relative dimensions of the core and cladding, as well as the composition of the core and cladding, correspond to the desired dimensions and corresponding composition of the optical fiber to be drawn from the preform.

Fiber is typically drawn from the preform by mounting the preform atop a draw tower. As understood by one of ordinary skill in the art, a typical draw tower includes a high frequency induction furnace or a resistance furnace for heating one end of the preform. A spool pulls the fiber from the heated end of the preform and the fiber is wound onto the spool. A diameter measuring element can be included for measuring the diameter of the fiber, and appropriate feedback loops that maintain the desired diameter by adjusting one or more of 1) the rate at which the preform is fed into the furnace; 2) the tension with which the fiber is pulled; and 3) the temperature of the furnace. A coating apparatus can be provided for applying a protective coating to the outside of the fiber, and an ultraviolet curing station for curing the coating before the fiber is wound on the spool. Apparatus for monitoring the thickness and/or the concentricity of the protective coating is also usually included. The protective coating is typically an acrylate polymer. Draw tower technology is well understood by those of ordinary skill the art and further detail is not included here.

A preform can be made by a variety of suitable methods, including vapor phase methods such as outside vapor deposition (OVD), Modified Chemical Vapor Deposition (MCVD), Chemical Vapor Deposition (CVD) and Vapor Axial Deposition (VAD) and combinations thereof. Vapor phase methods usually employ suitable gas precursors that are introduced to a hot substrate, a hot zone, or directly into a flame. The latter technique is known as flame hydrolysis. In the flame hydrolysis technique, precursor gases are introduced to a flame to form soot that is deposited on a substrate, such as the inside, outside or end of a tube or rod. The soot is subsequently heated and sintered using an oven or furnace. The tube or rod can form a part of the resultant optical fiber preform, or can be removed. The OVD and VAD processes typically involve flame hydrolysis. In other vapor phase techniques, such as CVD and MCVD, precursor gases are introduced to a hot zone and/or a heated substrate, which can again be a tube or rod. One supplier of MCVD lathes and of draw towers is Nextrom Technologies of Finland. Nextrom Technologies has a U.S. office located at 1650 Satellite Boulevard, Duluth, Ga. 30097.

The technique known as "solution doping" can also be used to introduce materials into an optical fiber preform. In solution doping, soot is deposited on a substrate, and the soot is impregnated with a fluid precursor before sintering the soot into glass. Soot can be produced by one or more of the foregoing techniques, with modification when necessary to avoid contemporaneous sintering of the soot into glass. For example, MCVD can be used to deposit soot by reducing the temperature of the heating torch such that soot is deposited but not sintered on the inside of the substrate tube. The tube is then placed in a solution that includes fluid precursor materials, such as, for example, erbium chloride, that impregnates the porous soot. Subsequent drying, oxidation of the erbium and sintering of the soot provides a glass that includes $Er_2O_3$, as very desirable dopant for amplifying or generating light using an optical fiber. The solution doping technique can be used to incorporate a variety of other materials into an optical fiber preform. Solution doping can be used to introduce materials into the preform that are otherwise difficult to introduce using standard vapor techniques, such as many of the rare earths. Solution doping is typically used to introduce rare earth and other dopants into the preform core.

Also known in the art are Sol-Gel techniques, wherein a suitable solution is cast in a mold and then gelled, removed and sintered to provide a glass article that can be part or all of a preform. For example, in one practice of the invention, the mold could include provision for forming the longitudinally extending apertures that will receive the stress inducing regions and the core of the resultant optical preform.

Each of the foregoing techniques can include one or more overjacketing steps wherein a member formed by one of the foregoing techniques is overjacketed with a glass tube that will typically form additional cladding. Glass tubes and rods suitable for deposition of soot, the deposition of glass, or for use as an overjacket are available from Heraeus Amersil, Inc. 3473 Satellite Blvd., Duluth, Ga., 30096. The glass rods and/or tubes can include various types of glasses, such as, for example, silica glass, borosilicate glass, a fluorinated silica glass, a phosphate glass and other types of glasses.

Rods and tubes can also be made by casting molten glass into appropriate molds. For example, one technique for providing a tube is to cast molten glass into a mold that is spun on a lathe. Centrifugal force causes the molten glass to press outward again the walls of the mold such that the glass cools to form a tube.

Typically, a preform is a solid cylinder of glass made using one or more of the techniques described above. However, one or more of the foregoing techniques can be used to make glass members that are assembled together to form a preform. For example, it is known to insert selected rods inside tubes, without necessarily fusing the rods to the tubes, and to draw such a preform into of fiber. The rod-in-tube method can be used, for example, to fabricate microstructured fibers wherein the cladding includes a longitudinally extending array of features that alter the characteristics of the cladding (such as providing a photonic bandgap or lowering the average index of refraction of the cladding) such that light tends to be confined to the core. A vacuum can be applied to the assembly during drawing fiber from the preform.

The preform or one of more of the members included in the preform can be shaped, such as by grinding, so as to provide a desired geometrical feature in the resultant drawn fiber.

Techniques are known for fabricating an optical fiber without a preform. For example, the nested crucible technique is one of the older techniques known for forming an optical fiber. A first crucible containing molten glass that will form the cladding of the fiber is disposed about a second, inner crucible that contains molten glass that will from the core of the optical fiber. The crucibles include concentric openings from which the molten glass flows to form the optical fiber, with the opening of the second inner crucible being inside of the opening of the outer crucible. The nested crucible technique is not always favored, as impurities from the crucibles can be introduced into the glass fiber. However, the nest crucible technique is well established and has been used extensively, especially in the formation of non-oxide multicomponent glass fibers. The crucibles are heated to turn glass powder placed into the crucible into the molten glass that exits the apertures to form the optical fiber. Considerable care can be exercised in preparation of the glass powder, just as considerable care is exercised in the preparation of the preform.

Most typically, silica is the host glass of the optical fiber or preform, to which other materials are added. Common dopant materials used with silica include aluminum, boron, fluorine, germanium, phosphorus, titanium, the rare earths (such as, for example, erbium, ytterbium and lanthanum) and transition metals, which can be used to provide selected attenuation. However, other types of glass, such as, for example, chalcogenide glass, ZBLAN glass, phosphate glass, fluoride glass, germanium based glass and the like, as well as any of the single crystal or polycrystalline materials such as thallium bromoiodide, germanium, zinc selenide, and the like, may be found suitable. By way of example, and not of limitation, an optical fiber according to the invention may comprise any of these or other materials, or variants thereof, singly or in combination for the core, cladding or other layers.

Several embodiments of the invention have been described and illustrated herein. Those of ordinary skill in the art will readily envision a variety of other means and structures for performing the functions and/or obtain the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teachings of the present invention are used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7th Edition, Revision 1. Furthermore, statements in the specification, such as, for example, definitions, are understood to be open ended unless otherwise explicitly limited.

Having described the invention, what is claimed as new and to be secured by Letters Patent is:

1. An improved optical fiber for delivering light having a selected wavelength to or from a work object, comprising:
    a glass core that is multimode at the selected wavelength, said core comprising an index of refraction and a diameter $D_{core}$;
    a glass cladding disposed about said glass core, said glass cladding comprising an outer diameter $D_{cladding}$ and a first index of refraction that is less than said index of refraction of said core, where $[D_{cladding}/D_{core}]^2$ is no greater than 1.5, and wherein if one or both of said diameters $D_{core}$ and $D_{cladding}$ have a maximum and a minimum value, the maximum value is used in the foregoing formula; and
    a second cladding disposed about said glass cladding, said second cladding comprising an optically cured polymer, said polymer comprising an index of refraction that is less than said first index of refraction and having a modulus of no greater than 100 MPa.

2. The optical fiber of claim 1 wherein said modulus is no greater than 50 MPa.

3. The optical fiber of claim 1 wherein said modulus is no greater than 10 MPa.

4. The optical fiber of claim 1 comprising a region surrounding said second cladding, said region comprising a selected polymer comprising an index of refraction that is greater than said index of refraction of said optically cured polymer.

5. The optical fiber of claim 4 wherein said selected polymer comprises a modulus that is no less than 500 MPa.

6. The optical fiber of claim 1 wherein said core consists essentially of silica glass.

7. The optical fiber of claim 1 wherein $D_{core}$ is at least 250 microns.

8. The optical fiber of claim 1 wherein said core and said cladding are drawn from a preform.

9. An improved high power optical fiber for delivering light having a selected wavelength to or from a work object, comprising:
    a glass core comprising silica, said glass core being multimode to the extent that it can support at least 100 modes at the selected wavelength, said core comprising an index of refraction and a diameter $D_{core}$ that is at least 250 microns;
    a glass cladding disposed about said glass core, said glass cladding comprising silica, said cladding comprising an index of refraction that is less than said index of refraction of said core;
    a second cladding disposed about said glass cladding, said second cladding comprising an optically curable polymer, said optically cured polymer comprising an index of refraction that is less than said first index of refraction and having a modulus of no greater than 100 MPa.
    a region disposed about said second cladding, said region comprising a polymer comprising an index of refraction that is greater than said index of refraction of said core.

10. The optical fiber of claim 9 wherein said fiber comprises an index of refraction profile of said core relative to said cladding, said index of refraction profile comprising a step index of refraction profile.

11. The optical fiber of claim 9 wherein said glass cladding further comprises a diameter $D_{cladding}$, where $[D_{cladding}/D_{core}]^2$ is no greater than 1.5, wherein if one or both of said diameters $D_{core}$ and $D_{cladding}$ have a maximum and a minimum value, the maximum value is used in the foregoing formula.

12. The optical fiber of claim 9 wherein $D_{core}$ is at least 500 microns.

13. An improved optical fiber for the delivery of optical energy to or from a work object, comprising:
    a multimode core, said core comprising a diameter $D_{core}$;
    a cladding disposed about said core, said cladding further comprising an outer diameter $D_{cladding}$, where $[D_{cladding}/D_{core}]^2$ is no greater than 1.5, and where if one or both of said diameters and $D_{core}$ and $D_{cladding}$ have a maximum and a minimum value, the maximum value is used in the foregoing formula; and
    wherein said core comprises a non circular outer perimeter.

14. The optical fiber of claim 13 wherein said core consists essentially of silica.

15. The optical fiber of claim 13 wherein said core comprises a step index of refraction profile.

16. The optical fiber of claim 13 wherein a majority of the length of said outer perimeter conforms to a circle having a substantially constant radius.

17. The optical fiber of claim 13 wherein said cladding comprises a polymer.

18. The optical fiber of claim 13 wherein said cladding comprises a glass.

19. The optical fiber of claim 13 wherein said cladding comprises an index of refraction, said fiber further comprising a second cladding disposed about said cladding, said second cladding comprising a second index of refraction that is less than said first index of refraction.

20. The optical fiber of claim 13 wherein said outer perimeter comprises at least one inwardly oriented section.

21. The optical fiber of claim 13 wherein said outer perimeter comprises at least one straight section.

22. The optical fiber of claim 13 wherein said outer perimeter comprises an outwardly curved section having a first radius of curvature and another outwardly curved section having a second radius of curvature that is different than said first radius of curvature.

23. An improved optical fiber for the delivery of optical energy to or from a work object, comprising:
    a multimode core, said core comprising a diameter $D_{core}$;
    a cladding disposed about said core, said cladding further comprising an outer diameter $D_{cladding}$, where $[D_{cladding}/D_{core}]^2$ is no greater than 1.5, and where if one or both of said diameters and $D_{core}$ and $D_{cladding}$ have a maximum and a minimum value, the maximum value is used in the foregoing formula; and
    wherein said core comprises means for affecting the power distribution amongst modes propagated by said core of said fiber.

24. The optical fiber of claim 23 wherein said means comprises at least one region of said core comprising an index of refraction that is different than the index of refraction of at least a portion of the core contacting said region.

25. The optical fiber of claim 23 wherein said means comprises the outer perimeter of said core being non-circular.

26. The optical fiber of claim 23 wherein said core has an outer perimeter and wherein said means comprises at least one inwardly oriented section of said outer perimeter of said core.

27. The optical fiber of claim 23 wherein said core comprises an outer perimeter, and wherein at least the majority of the length of said outer perimeter conforms to a circle having a substantially constant radius.

28. The optical fiber of claim 23 wherein said means comprises said core having at least one region comprising an index of refraction that is different than the index of refraction of at least a portion of the core contacting said region.

29. The optical fiber of claim 28 wherein said optical fiber extends along a longitudinal axis, and where said at least one region extends along said longitudinal axis.

30. The optical fiber of claim 28 wherein said at least one region comprises a void.

31. The optical fiber of claim 28 wherein said at least one region comprises a plurality of regions that are not coextensive with said core along the longitudinal direction.

32. The optical fiber of claim 23 wherein said means comprises said core having an inner region comprising a first index of refraction and a second region disposed about inner region, said second region comprising a second index of refraction that is greater than said first index of refraction.

33. The optical fiber of claim 32 wherein said inner region comprises a diameter and wherein said outer region comprises an outermost diameter, and wherein said diameter is greater than the difference between said outermost diameter and said diameter.

34. The optical fiber of claim 23 wherein said means comprises said core having a generally concave index of refraction profile.

35. An improved optical fiber for the delivery of optical energy to or from a work object, comprising:

a multimode core, said core comprising a diameter $D_{core}$;

a cladding disposed about said core, said cladding further comprising an outer diameter $D_{cladding}$, where $[D_{cladding}/D_{core}]^2$ is no greater than 1.5, and where if one or both of said diameters and $D_{core}$ and $D_{cladding}$ have a maximum and a minimum value, the maximum value is used in the foregoing formula;

said core comprising an inner region comprising a first index of refraction and a second region disposed about said inner region, said second region comprising a second index of refraction that is greater than said index of refraction of said inner region by a selected amount; and wherein said cladding comprises an index of refraction that is less than said first and second indices of refraction.

36. An improved optical fiber for the delivery of optical energy to or from a work object, comprising:

a multimode core for propagating light having selected operating wavelength, said core supporting at least 200 modes at said operating wavelength;

said core comprising an inner region comprising a first index of refraction and a second region disposed about said inner region, said second region comprising a second index of refraction that is greater than said index of refraction of said inner region by a selected amount; and a cladding disposed about said core, said cladding comprising an index of refraction that is less than said first and second indices of refraction;

wherein said core comprises a diameter $D_{core}$ and said cladding further comprising an outer diameter $D_{cladding}$, where $[D_{cladding}/D_{core}]^2$ is no greater than 1.5, and where if one or both of the said diameters $D_{core}$ and $D_{cladding}$ have a maximum and minimum value, the maximum value is used in the foregoing formula.

* * * * *